United States Patent
Grennan et al.

(10) Patent No.: US 6,215,212 B1
(45) Date of Patent: *Apr. 10, 2001

(54) SHAFTLESS ROTOR CONSTRUCTION

(75) Inventors: Robert Grennan, Stillman Valley; William Greenlee, Caledonia; David Halsey, Rockford; W. Glen Smith, Caledonia, all of IL (US)

(73) Assignee: Hamilton Sundstrand Corporation, Rockford, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/373,322

(22) Filed: Aug. 12, 1999

(51) Int. Cl.[7] ................ H02K 9/00; H02K 9/04
(52) U.S. Cl. .......... 310/60 R; 310/58; 310/60 A; 310/61; 310/62; 310/63
(58) Field of Search .................. 310/60 R, 58, 310/60 A, 61, 62, 63, 90.5, 90, 59, 216, 91, 261; 29/596–598

(56) References Cited

U.S. PATENT DOCUMENTS

| | | | |
|---|---|---|---|
| 1,193,897 | * 8/1916 | Holbech | 310/216 |
| 1,577,303 | * 3/1926 | Schurch | 310/52 |
| 1,877,904 | * 9/1932 | Laffoon | 310/52 |
| 3,716,732 | * 2/1973 | Tillma | 310/61 |
| 3,737,988 | * 6/1973 | Bednarski | 310/61 |
| 3,867,655 | * 2/1975 | Stengel et al. | 310/66 |
| 3,882,336 | * 5/1975 | Boyd et al. | 310/216 |
| 3,932,778 | * 1/1976 | Watanbe | 310/61 |
| 4,286,183 | * 8/1981 | Montgomery | 310/62 |
| 4,383,191 | * 5/1983 | Mizuyama et al. | 310/59 |
| 4,469,970 | * 9/1984 | Neumann | 310/156 |
| 4,614,888 | * 9/1986 | Mosher et al. | 310/261 |
| 4,864,176 | * 9/1989 | Miller et al. | 310/194 |
| 5,086,246 | * 2/1992 | Dymond et al. | 310/269 |
| 5,703,421 | * 12/1997 | Durkin | 310/61 |
| 5,898,246 | * 4/1999 | Hoffman | 310/60 R |
| 5,994,804 | * 11/1999 | Grennan et al. | 310/60 R |

* cited by examiner

Primary Examiner—Tran Nguyen
(74) Attorney, Agent, or Firm—Wood Phillips VanSanten Clark & Mortimer

(57) ABSTRACT

A shaftless rotor (12) for a dynamoelectric machine includes a stack (20) of ferrous laminations (22) provided with a central opening (110) extending through the stack (20) and adapted to be located on the axis of rotation (14) of the rotor (12). A sleeve (112) is located in the central opening (110) for orienting the laminations (22) with respect to one another. Manifold and vane clamping pieces (52) are located on opposite sides of the stack (20) and engage the endmost laminations (22) and the sleeve (112). A pair of spaced shaft segments (24,26) engage respective ones of the clamping pieces (52) and a single tie bolt (32) extends through the sleeve (112) between the shaft segments (24,26) to interconnect the same. The tie bolt is in tension to apply clamping force to the shaft segments (24,26) for transmittal to the clamp pieces (52) to the laminations (22) in the stack (20).

12 Claims, 3 Drawing Sheets

SHAFTLESS ROTOR CONSTRUCTION

FIELD OF THE INVENTION

This invention relates to dynamoelectric machines, and more particularly, to a shaftless rotor construction for use in such machines.

BACKGROUND OF THE INVENTION

Dynamoelectric machines come in widely varying shapes, sizes and capacities. Some are employed as motors while others are employed as generators. And some are employed as combination motors-generators, meaning that they can be operated either as a motor or as a generator, depending upon exactly what function is desired of the machine at a given point in time.

In some cases, volume and weight constraints are minimal, while in others they are critical. For example, in aerospace applications, weight is always a concern. Volume constraints are also a concern lest the machine occupy too much space on an aircraft or even contribute to a less efficient aerodynamic shape as a result of its bulk.

Most such machines have a shafted rotor which is to say that a single shaft extends through the rotor body to journal the same for rotation about an axis within a stator. This is, however, not always desirable. For example, in some machines, the presence of a shaft extending through the rotor body may interfere with the magnetic flux path of the machine and thus contribute to magnetic inefficiency which in turn may lower the capacity of a machine having a given size. This is particularly true in dynamoelectric machines having a relatively small number of poles on the rotor. In such cases, it may be desirable to provide a shaftless rotor. See, for example, commonly assigned U.S. Pat. No. 4,562,641 issued Jan. 7, 1986 to Mosher et al. In other cases, the presence of a single shaft may contribute to weight and/or dictate enlargement of the rotor for a given application in that rotor components cannot be located in the area of the rotor occupied by the shaft. This in turn requires that such components be located elsewhere in the rotor which may increase its size in order to house the components and/or may decrease magnetic efficiency as a result of locating such components radially outward of the shaft. In such cases it would be desirable to provide a shaftless rotor for the purpose of reducing weight and/or allowing the part of the rotor that would otherwise be occupied by the shaft to be used for housing other rotor components to thereby reduce overall rotor size. It would also be desirable from the standpoint of reducing the mass of the rotating components of the dynamoelectric machine to enhance the ability of the dynamoelectric machine to operate at high speed.

The present invention is directed to providing such a shaftless rotor for a dynamoelectric machine.

SUMMARY OF THE INVENTION

It is the principal object of the invention to provide a new and improved shaftless rotor for use in a dynamoelectric machine. It is also an object of the invention to provide a dynamoelectric machine having a new and improved shaftless rotor.

The invention, according to an exemplary embodiment and one feature thereof, achieves the foregoing object in a shaftless rotor that includes a stack of ferrous laminations. A central opening extends through the stack and is adapted to be located on an axis of rotation for the rotor. A sleeve extends through the stack through the central opening and orients the laminations with respect to one another. Clamping pieces are disposed on opposite ends of the stack and engage the end most laminations in the stack and the sleeve. A pair of spaced shaft elements, one at each end of the stack, are provided to engage respective ones of the clamp pieces. The shaft segments are located on the rotational axis of the rotor. A single tie bolt extends through the sleeve between the shaft segments and interconnects the same. The tie bolt is in tension to apply clamping force to the shaft segments for transmittal through the clamp pieces to the laminations in the stack.

In one embodiment of the invention, the sleeve is cylindrical and includes an inner diameter substantially larger than the tie bolt so that an annular coolant passage exists between the sleeve inner diameter and the tie bolt and which extends from end to end of the lamination stack.

Preferably, the clamping pieces include fluid passages in fluid communication with the annular coolant passage.

In a preferred embodiment, the fluid passages include vanes for pumping coolant from the annular coolant passage to both ends of the stack.

In one embodiment of the invention, the tie bolt is enlarged and includes a chamber. The chamber has an inlet end adapted to be in fluid communication with a source of coolant and openings are located in the tie bolt to extend from the chamber to the exterior of the tie bolt for establishing fluid communication between the inlet end and the annular coolant passage.

In a highly preferred embodiment, the tie bolt has a reduced diameter central section that is connected to the enlarged end by a frusto-conical section. The openings are located in the frusto-conical section.

According to another facet of the invention, a shaftless rotor for a dynamoelectric machine is provided and includes a stack of ferrous laminations having opposed ends. Means are provided to align the laminations in the stack to define a rotor body. A central opening extends through the stack and has a first size. A tie bolt, having a central section extending through the central opening is provided. The tie bolt central section has a second size less than the first size to define an annular coolant passage between the tie bolt central section and the central opening. The rotor includes a pair of spaced shaft segments, one at each end of the opposed ends of the stack which are interconnected by the tie bolt. The tie bolt is in tension to provide a clamping force for the shaft segments for transmission to the opposed ends of the stack to clamp the laminations in the stack in assembled relation.

A preferred embodiment envisions a dynamoelectric machine including a stator having a rotor receiving opening and a rotor construction such as set forth above disposed in the rotor receiving opening. Means are provided for journalling the shaft segments to journal the rotor within the stator.

Other objects and advantages will become apparent from the following specification taken in connection with the accompanying drawings.

DESCRIPTION OF THE PREFERRED EMBODIMENT

Figure 1:
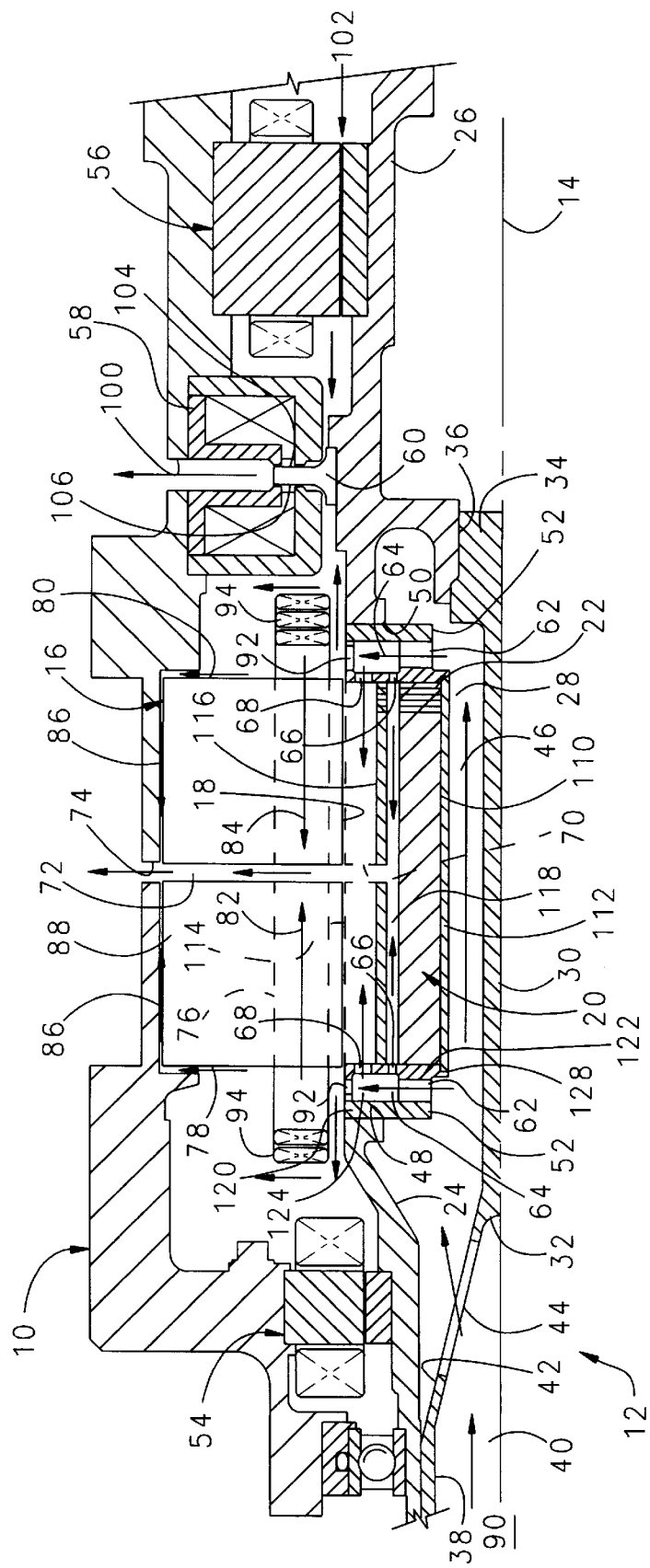
FIG. 1 is a somewhat schematic, partial sectional view of a dynamoelectric machine embodying a rotor made according to the invention.

An exemplary embodiment of a dynamoelectric machine made according to the invention is illustrated in the drawing. Although no restriction to intended use is intended, in one preferred usage of the invention, the dynamoelectric machine is employed as a motor/generator of the switched reluctance variety. Referring to FIG. 1, a general description of a preferred embodiment will be given followed by a more detailed description with reference to other figures of drawing.

The dynamoelectric machine includes a housing, generally designated 10, in which a rotor, generally designated 12, is journalled for rotation about an axis 14. Mounted within the housing 10 is a stator, generally designated 16, having a central opening 18 in which the rotor 12 is disposed. The rotor 12 is defined by a lamination stack, generally designated 20, and made up of a plurality of ferromagnetic laminations 22.

Shaft segments 24 and 26 are abutted against the right and left sides of the lamination stack 20 as viewed in FIG. 1 and are concentric with the axis 14. The lamination stack 20 includes an enlarged, central opening 28 through which the reduced diameter section 30 of a tie bolt 32 extends. The tie bolt 32 includes a threaded end 34 which is threaded into a threaded bore 36 in the shaft segment 26. At its opposite end, the tie bolt 32 includes an enlarged section 38 provided with an interior chamber 40. A necked down frusto-conical section 42 interconnects the enlarged section 38 and the reduced diameter section 30. It includes a series of openings 44 (only one of which is shown) to establish fluid communication between the chamber 40 and an annulus 46 defining an air passage between the reduced diameter section 30 of the tie bolt 32 and the central opening 28 in the lamination stack 20. The shaft section 24 is secured to the tie bolt 32 by any suitable means, typically threads, at its enlarged diameter end 38. Both the shaft sections 24 and 26 include flat axially facing, annular surfaces 48,50 which abut respective vane and manifold assemblies 52 which in turn abut opposite ends of the lamination stack 20. The tie bolt 32 is in tension and thus acts through the shaft segments, 24,26, to compress the lamination stack 20 via the vane and manifold assemblies 52, which also act as clamping pieces, while locating the same in a position concentric with the axis 14. It will thus be appreciated that a shaftless rotor assembly is defined.

The shaft segment 24 is journalled by a magnetic journal bearing, generally designated 54, which may be of conventional construction. Similarly, the shaft segment 26 is journalled by a magnetic journal bearing, generally designated 56, which may also be of conventional construction. The journal bearings 54 and 56 are contained within the housing 10.

An electromagnetic assembly 58 of a magnetic thrust bearing is mounted in the housing 10 about the shaft segment 26. The lafter mounts a thrust disc 60 and the bearing acts to absorb forces on the rotor 12 exerted in the axial direction.

The vane and manifold assemblies 52 on opposite ends of the lamination stack 20 include vanes 62 for pumping air into respective manifold chambers 64. The air may exit a manifold chamber 64 via axially directed ports 66 and 68 to cool the rotor 12. As cooling air enters from both ends of the lamination stack 20 generally centrally thereof, a series of radial passages 70 in the lamination stack 20 serves to direct air toward the stator 16. The stator has at least one central, radially extending passage 72 aligned with the passages 70 for receiving the air and conducting it to an outlet 74 in the housing 10.

The stator 16 includes a plurality of windings 76 which are spaced from one another to define axial air cooling passages within the stator 16 that extend inwardly toward the passage 72 from both ends 78,80 of the stator 16. These passages flow air in the direction of arrows 82,84 as will be described in greater detail hereinafter.

In addition, air cooling passages 86 extend axially toward the passage 72 and the outlet 74 at the interface of the housing 10 and the back iron 88 of the stator 16.

Cooling air is received from an inlet 90 shown schematically on the left-hand side of FIG. 1 and in fluid communication with the chamber 40 to provide the principal cooling of the rotor 12 and the stator 16. The cooling air enters the chamber 40 and exits the same via the openings 44 to flow to the vane and manifold assemblies 52. In the case of the right-hand manifold assembly 52 as shown in FIG. 1, the air flow is through the central passage 46 in the rotor 12.

The vanes 62 act as impellers to impel the air into the manifold 64. From there, air flows axially from the ports 66,68 through the cooling passages in the rotor to be described in greater detail to the radial passages 70. It also exits radially facing ports 92 to be directed to the end turns 94 of the windings 76. The end turns 94 are, of course, located exteriorally of the iron body making up the stator 16.

Such air also enters the passages between the windings to flow in the direction of the arrows 82 and 84 to the radial passage 72 for ultimate discharge through the outlet 74. In addition, the air flows along the sides 78,80 of the iron making up the stator 16 to the passages 86 to flow to the outlet 74 while cooling the back iron 88 of the stator 16.

The housing 10 includes an additional outlet 100 that is located radially outward of the thrust disc 60 and which extends into the magnet assembly 58. A further inlet, shown schematically at 102 on the right-hand side of FIG. 1, allows air to be drawn in to the housing 10 as a result of windage during operation of the machine. That is to say, air about the sides of the thrust disc 60, and in this instance, a side 104 thereof, is drawn in through the thrust-bearing 56 and pumped by the thrust disc 60 through the thrust bearing to cool the disc 60 and the right-hand side of the magnet assembly 58 of the magnetic thrust bearing.

The lamination stack 20, as alluded to previously, includes a central opening 110 which typically will be circular in shape and of a considerably larger diameter than that of the reduced diameter section 30 of the tie bolt 32. A cylindrical sleeve 112 is located within the central opening 110 in the stack 20 and serves to orient the laminations 22 to one another. The inner diameter of the sleeve 112 is also considerably greater than the diameter of the reduced diameter section 30 to define the annulus 46. As the laminations 22 will typically be formed with radially outwardly directed poles 114 (only one of which is shown), the interface of the sleeve 112 and the laminations 22 may be provided with appropriate keying means so as to orient the laminations 22 with respect to one another.

The poles 114 are separated from one another by axial recesses or grooves 116. In addition, the stack 20 includes axially extending passages 118 which extend to the central radial passage 70 from both ends of the lamination stack 20. The axial recesses or grooves 116 are aligned to receive air from the ports 68 in the vane and manifold assemblies 52, while the passages 118 are aligned with the ports 66 in the vane and manifold assemblies 52 to receive air therefrom.

The vane and manifold assemblies 52 are mirror images of one another and each is made up of two components. One is simply a flat disc 120 while the other is a vane mounting piece 122. The disc 120 fits against the vane mounting disc 122 so as to define an annular manifold chamber 124 radially outward of the vanes 62 and in fluid communication with the ports 66, 68 and 92.

Figure 2:
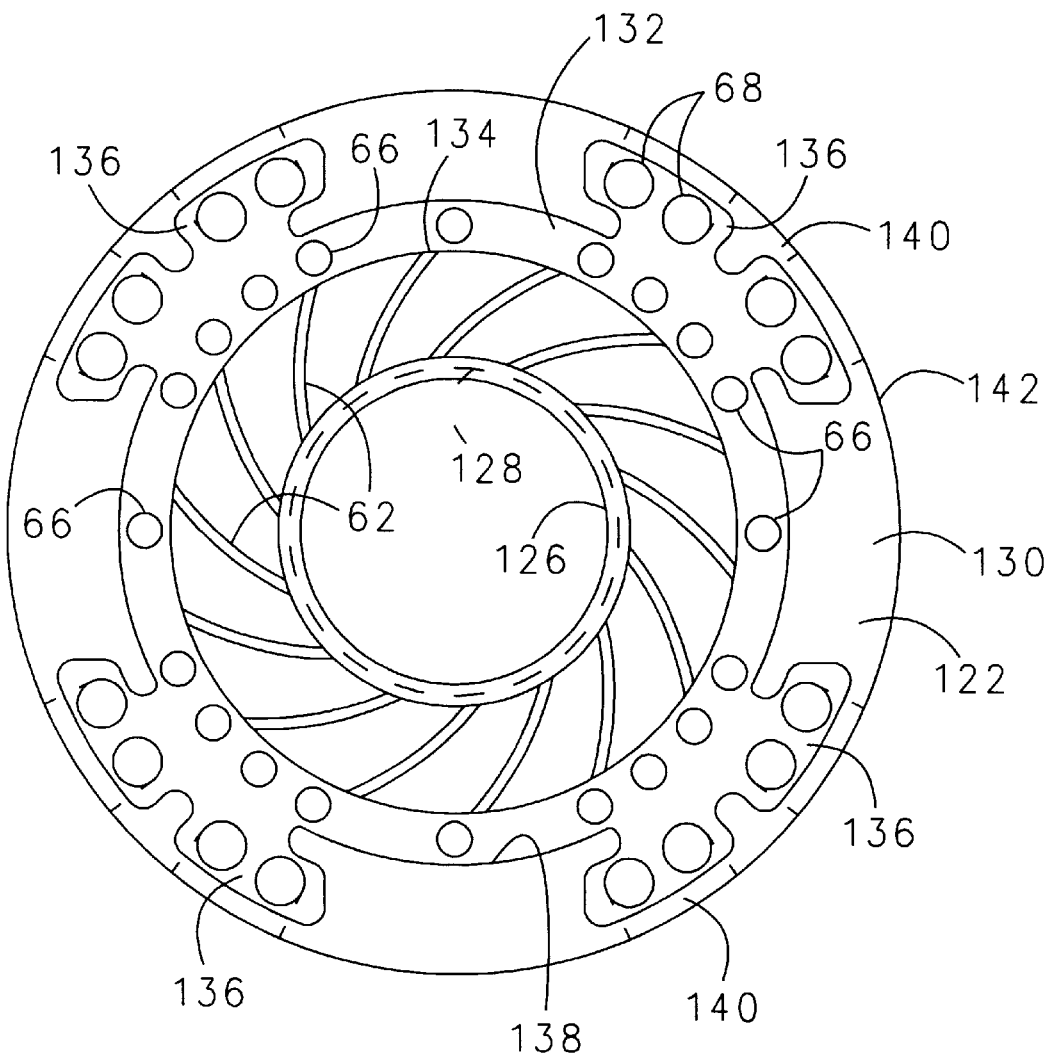
FIG. 2 is a side elevation of part of a clamping assembly embodied in the rotor.
Figure 3:
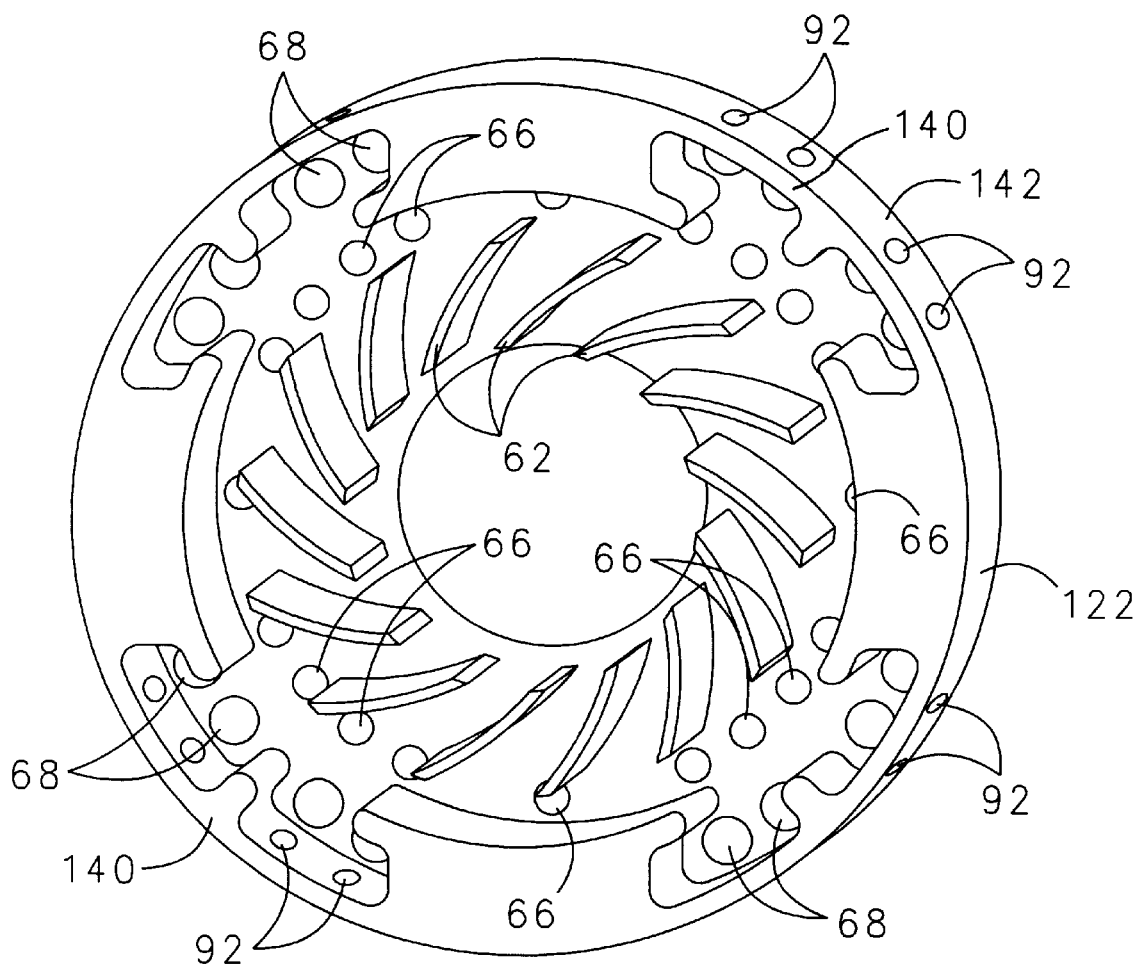
FIG. 3 is a perspective view of the part of the clamping assembly illustrated in FIG. 2.

Referring now to FIGS. 2 and 3, the vane mounting disc 122 will be described in greater detail. The same includes a central opening 126 of the same diameter as the inner diameter of the sleeve 112. On the side of the vane mounting disc 122 opposite the vanes 62, a shoulder 128 is formed into which the end of the sleeve 112 is fitted.

With the exception of the shoulder 128, both sides of the disc 122 are flat although one side 130 has an annular recess 132 located radially outward of the radially outward extremities 134 of the vanes 62. The recess 132 is irregular in shape to the extent that it includes four segments 136 which are identical one to the other and which extend radially outward of an annular wall 138 defining the remainder of the recess. The segments 136 have the shape illustrated in FIG. 2 to define relatively thin webs 140 between the recess segments 136 and the perimeter 142 of the disc 122. As seen in FIG. 3, the ports 92 are located in the webs 140 and extend radially inward to be in fluid communication with the recess 136. In addition, the axial ports 68 are located within the recess segments 136 and are adapted to align with respective ones of the axial grooves 116 in the lamination stack 20.

Just radially outward of the radially outer extremities 134 of the vanes 62 and opening to the recess 132 are the ports 66 which, it will be recalled, open to the respective coolant passages 118 (FIG. 1) that extend axially through the lamination stack 20. Consequently, during rotation of the rotor 12, the vanes 62 serve to pump coolant, normally air, radially outward to the manifold chamber 122 which in turn is defined by the recess 132, including the sections 136 thereof. From there, the coolant may enter the ports 66, 68 or 92 to provide for cooling.

It is to be noted that the left-hand vane and manifold assembly 52 draws coolant directly from the openings 44 in the tie bolt 32 whereas the right-hand vane and manifold assembly 52 draws air from such openings 44 via the annulus 46 through the rotor.

During assembly, the tie bolt 32 is tightened to the shaft segments 24 and 26 and placed in tension. As a result, it places a clamping force on the shaft segments 24,26 which in turn is imposed on the disc 120 and the vane mounting plates 122 which in turn apply the force to the laminations 22 and the sleeve 112 to hold the rotor in assembled relation.

It will be appreciated that the rotor construction is shaftless in the sense that it does not have a single shaft extending entirely through the rotor 12. Two shaft segments or shaft ends are employed and the same are held in place along with the lamination stack 20 as a result of clamping forces imposed on the latter via the vane and manifold assemblies 52 which, as mentioned previously, also act as clamping pieces.

This allows a relatively small diameter tie bolt 32 to be used in lieu of a shaft; and that in turn allows the provision of the central, annular passage 46 to provide a means for conveying cooling air to both ends of the rotor body without interfering with the magnetic flux path of the rotor itself. Moreover, rotor mass is reduced considerably to meet weight concerns and the rotor may be made of relatively small size since that part of the body that would normally be occupied by a shaft, i.e. the central opening 110, is occupied by a coolant passage which otherwise would have to be located elsewhere in the rotor, thereby increasing its size if magnetic interference is to be avoided.

Consequently, the rotor of the present invention is ideally suited for use in a high speed, high power density dynamoelectric machine.

What is claimed is:

1. A dynamoelectric machine comprising:
    a stator having a rotor receiving opening;
    a rotor including a stack of ferrous laminations having opposed ends;
    a central opening in said stack and located on an axis of rotation for the rotor;
    a cylindrical sleeve extending through the stack through said central opening and orienting the laminations with respect to one another;
    a pair of annular clamping assemblies, one at each end of said stack, and clamping against said stack and said sleeve, said clamping assemblies including fluid passages provided with coolant pumping vanes;
    a pair of spaced shaft segments, one at each end of said stack and abutting the associated clamping assembly, and being located on said axis;
    a single tie bolt having a central section extending through said sleeve in spaced relation thereto to define an annular coolant passage between said sleeve and said tie bolt that extends between said opposed ends and said clamping assemblies and in fluid communication with said vanes, said tie bolt further interconnecting said shaft segments and being in tension to provide a clamping force to said clamping assemblies, said tie bolt, at one end, being enlarged in relation to said central section and having a chamber thereat;
    a coolant inlet to said chamber;
    at least one opening in said tie bolt extending between said chamber and the exterior of said tie bolt and in fluid communication with said annular coolant passage; and
    means journalling said shaft segments for rotation about said axis and within said rotor receiving opening.

2. A shaftless rotor for a dynamoelectric machine comprising:
    a stack of ferrous laminations having opposed ends;
    means aligning the lamination in the stack to define a rotor body;
    a central opening extending through said stack and having a first size;
    a tie bolt having a central section extending through said central opening and having second size less than said first size to define an annular coolant passage between said tie bolt central section and said central openings; and
    a pair of spaced shaft segments, one at each of said opposed ends and interconnected by said tie bolt, each having a clamping surface operatively engaging a corresponding one of said opposed ends, said tie bolt being in tension to provide a clamping force for said shaft segments for transmission to said opposed ends of said stack to clamp the laminations in said stack in assembled relation.

3. A dynamoelectric machine including a stator having a rotor receiving opening, the rotor of claim 2 disposed in said rotor receiving opening, and means journalling said shaft segments to journal said rotor within said stator.

4. The dynamoelectric machine of claim 3 wherein said aligning means comprise a cylindrical sleeve disposed within said central opening, said sleeve having an inner diameter substantially greater than said second size to define said annular coolant passage.

5. The shaftless rotor of claim 4 wherein one end of said tie bolt is enlarged and includes a chamber, said chamber having an inlet end adapted to be in fluid communication with a source of coolant, and openings in said tie bolt extending from said chamber to the exterior of the tie bolt for establishing fluid communication between said inlet end and said annular coolant passage.

6. The shaftless rotor of claim 5 wherein said tie bolt has a reduced diameter central section connected to said enlarged one end by a frusto-conical section, and said openings are located in said frusto-conical section.

7. A shaftless rotor for a dynamoelectric machine comprising:

a stack of ferrous laminations;

a central opening extending through the stack and located on an axis of rotation for the rotor;

a sleeve extending through the stack through said central openings and orienting the laminations with respect to one another;

clamping pieces on opposite ends of said stack and engaging the endmost lamination in the stack and said sleeve;

a pair of spaced shaft segments, one at each end of said stack and engaging respective ones of said clamp pieces, said shaft segments being located on said axis; and a single tie bolt extending through said sleeve between said shaft segments and interconnecting said shaft segments, said tie bolt being in tension to apply clamping force to said shaft segments for transmittal through said clamping pieces to the laminations in said stack, said tie bolt being located on said axis.

8. The shaftless rotor of claim 7 wherein said sleeve is cylindrical and includes an inner diameter substantially larger than said tie bolt so that an annular coolant passage exists between said sleeve inner diameter and said tie bolt and which extends from end to end of said stack.

9. The shaftless rotor of claim 8 wherein said clamping pieces include fluid passages in fluid communication with said annular coolant passage.

10. The shaftless rotor of claim 9 wherein said fluid passages include vanes for pumping coolant from said annular coolant passage to both sides of said stack.

11. The shaftless rotor of claim 8 wherein one end of said tie bolt is enlarged and includes a chamber, said chamber having an inlet end adapted to be in fluid communication with a source of coolant, and openings in said tie bolt extending from said chamber to the exterior of the tie bolt for establishing fluid communication between said inlet end and said annular coolant passage.

12. The shaftless rotor of claim 11 wherein said tie bolt has a reduced diameter central section connected to said enlarged one end by a frusto-conical section, and said openings are located in said frusto-conical section.

* * * * *

UNITED STATES PATENT AND TRADEMARK OFFICE
CERTIFICATE OF CORRECTION

PATENT NO. : 6,215,212 B1  
DATED : April 10, 2001  
INVENTOR(S) : Robert Grennan et al.

It is certified that error appears in the above-identified patent and that said Letters Patent is hereby corrected as shown below:

Column 1,
Line 10, insert:
-- This invention was made with government support under Contract No.: F33615-95-C-2509 with the United States Air Force. The government therefore has certain rights in this invention. --.

Signed and Sealed this

Twenty-first Day of February, 2006

JON W. DUDAS
*Director of the United States Patent and Trademark Office*